United States Patent
Tzeng

(10) Patent No.: US 8,510,809 B2
(45) Date of Patent: Aug. 13, 2013

(54) NETWORK AUTHENTICATION SYSTEM AND METHOD

(75) Inventor: Shi-Chuan Tzeng, Taipei (TW)

(73) Assignee: Chunghwa Telecom Co., Ltd., Taipei (TW)

( * ) Notice: Subject to any disclaimer, the term of this patent is extended or adjusted under 35 U.S.C. 154(b) by 986 days.

(21) Appl. No.: 12/571,717

(22) Filed: Oct. 1, 2009

(65) Prior Publication Data

US 2010/0186071 A1 Jul. 22, 2010

(30) Foreign Application Priority Data

Jan. 22, 2009 (TW) ................................ 98102425 A

(51) Int. Cl.
*H04L 29/06* (2006.01)
(52) U.S. Cl.
USPC ............................................. 726/5; 715/781
(58) Field of Classification Search
USPC ............................................. 726/5; 715/781
See application file for complete search history.

(56) References Cited

U.S. PATENT DOCUMENTS

2008/0183573 A1* 7/2008 Muschetto ...................... 705/14

FOREIGN PATENT DOCUMENTS

WO    WO 2007/085824    *   1/2007

* cited by examiner

*Primary Examiner* — Kambiz Zand
*Assistant Examiner* — Aubrey Wyszynski
(74) *Attorney, Agent, or Firm* — Pearne & Gordon LLP

(57) ABSTRACT

A network authentication system and method are provided. When an authentication request is initiated by a user of a computer device through a network, a display interface displaying an identifier, an authentication (matching) result corresponding to the identifier and one or more non-authentication (bogus) results unrelated to the identifier are transmitted to the computer device. The user then chooses among the authentication result and the non-authentication results with the goal of choosing the result that is associated with displayed identifier. If a non-authentication result is chosen, the user is given an opportunity to repeat the authentication. The identifier includes advertising information, thereby predictably producing a desired advertising effect.

15 Claims, 9 Drawing Sheets

NETWORK AUTHENTICATION SYSTEM AND METHOD

BACKGROUND OF THE INVENTION

1. Field of the Invention

The present invention relates to a network authentication system and method, and more particularly to a network authentication system and method integrated with network message identification and safe authentication.

2. Description of Related Art

Along with the development of the Internet, the number of web sites and web pages is increasing dramatically, and search engine platforms such as HiNet, Yahoo and Google play an important role in connecting users to relevant information provided by these web sites and web pages. However, if web sites and web pages have no distinguishing features, it is difficult for them to attract people's attention among all the competition. Therefore, marketing methods are used to increase the exposure and visibility of web sites, web pages and/or products. In particular, search engine platforms provide advertising services for web sites and web pages and obtain substantial income therefrom.

FIG. 1 is a diagram showing a conventional presentation style for an advertisement on a web page. As shown in the drawing, a web page 1' containing advertising information is built on the home page or an inside page of a web site stored on a server and passively waits for viewers to arrive and click and browse.

However, too many advertisements on the pages of web sites may cause visual fatigue and confusion, thereby reducing viewers' interest to click and browse the advertising content. As a result, the effectiveness of the advertising is reduced.

FIG. 2 is a diagram showing another presentation style of an advertisement on a web page. As shown in the drawing, a keyword search advertisement 2', such as Google Adsense, provides a brief description of the web site content such that viewers can browse the title and abstract of the web site content before determining whether to follow a hyperlink to the web site.

Although the above-described method reduces viewers' visual fatigue, the advertising effect of the keyword search advertisement 2' depends on the popularity of the web site or the advertisement. If the web site and the advertisement are not well known, it is hard to draw viewers' attention. As a result, the effectiveness of advertising is diminished.

Therefore, overcoming the above drawbacks so as to successfully attract viewers to click and browse advertisements has become an important issue.

SUMMARY OF THE INVENTION

According to the above drawbacks, the present invention provides a network authentication system and method such that a desired advertising effect can be achieved when a user operates a computer device in a network environment.

The network authentication method of the present invention is applied in a network authentication system, wherein the network authentication system is used to authenticate a user of a computer device initiating an authentication request through a network. The network authentication method comprises the following steps carried out by a network authentication system: storing a plurality of identifiers in a memory unit; receiving an authentication request from a computer device through a network, retrieving at least one of the identifiers from the memory unit, and processing the retrieved identifier so as to form an authentication result and a non-authentication result distinct from the authentication result, thereby allowing the network authentication system to generate a display interface and transmit the display interface to the computer device, wherein the display interface comprises an identifier display region for displaying the retrieved identifier and an option display region for displaying the authentication result and the non-authentication result; and, determining, after receiving a response from the user to the authentication result and the non-authentication result in the option display region from the computer device, whether the response is the same as the authentication result, wherein, if it is, the authentication is successful, and otherwise, the user of the computer device is required to repeat authentication.

The network authentication system of the present invention is used for authenticating a user of a computer device initiating an authentication request through a network. The network authentication system comprises: a memory unit for storing a plurality of identifiers; a processing module for receiving an authentication request from the computer device through a network, retrieving at least one of the identifiers from the memory unit, and processing the retrieved identifier so as to form an authentication result and a non-authentication result distinct from the authentication result and thereby generate a display interface comprising an identifier display region for displaying the retrieved identifier and an option display region for displaying the authentication result and non-authentication result; a transmitting module for transmitting the display interface to the computer device; an authentication option receiving module for receiving the response of the user to the authentication result and the non-authentication result in the option display region from the computer device; and an authentication module for determining whether the response is the same as the authentication result, wherein if it is, the authentication is successful, and otherwise, the user of the computer device is required to repeat authentication.

In the present invention, the identifiers comprise advertisement information. Accordingly, advertisement browsing, clicking and identification become necessary processes for a user initiating an authentication request, thereby achieving an advertising effect. Therefore, the present invention overcomes the conventional drawback of passively waiting for users to click and browse advertisements.

DETAILED DESCRIPTION OF PREFERRED EMBODIMENTS

The following illustrative embodiments are provided to illustrate the disclosure of the present invention, wherein these and other advantages and effects may be apparent to those skilled in the art after reading the disclosure of this specification.

Figure 1:
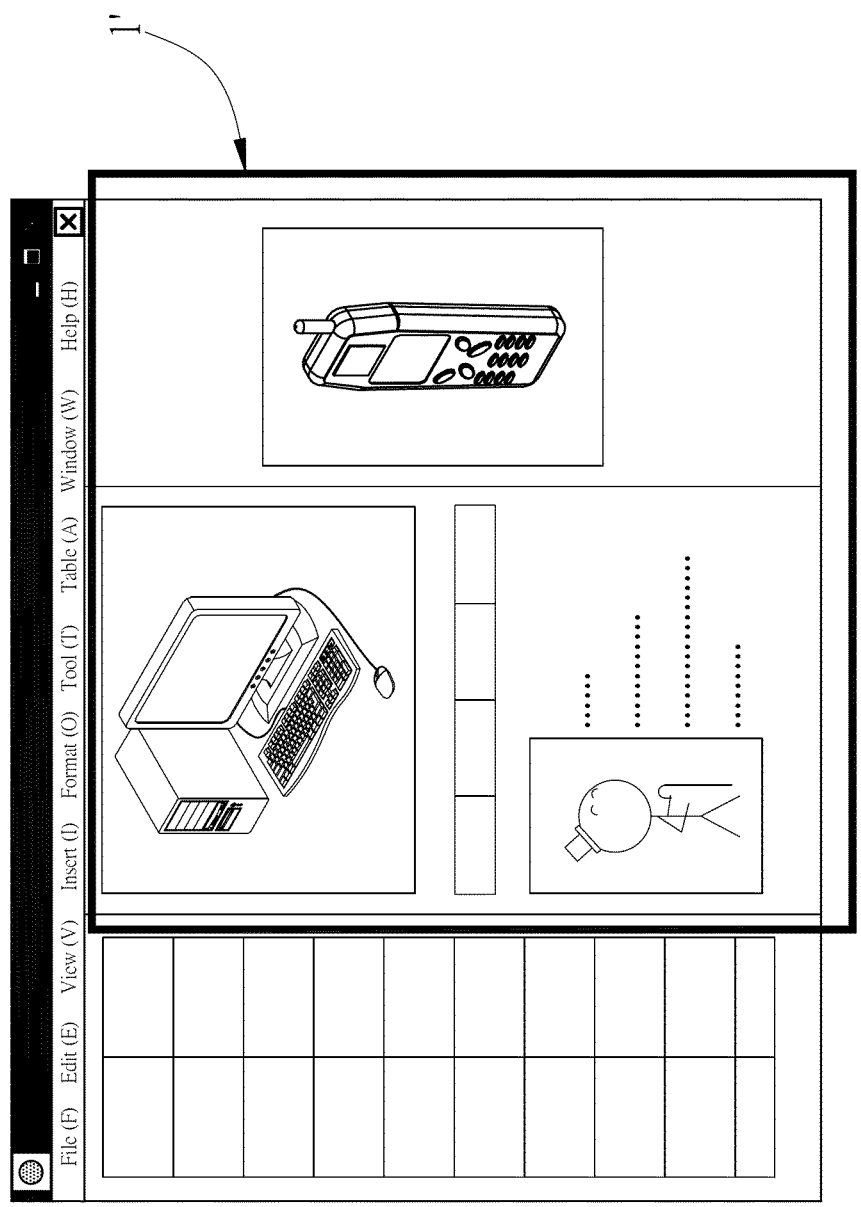
FIG. 1 is a diagram showing a conventional presentation style of an advertisement on a web page.
Figure 2:
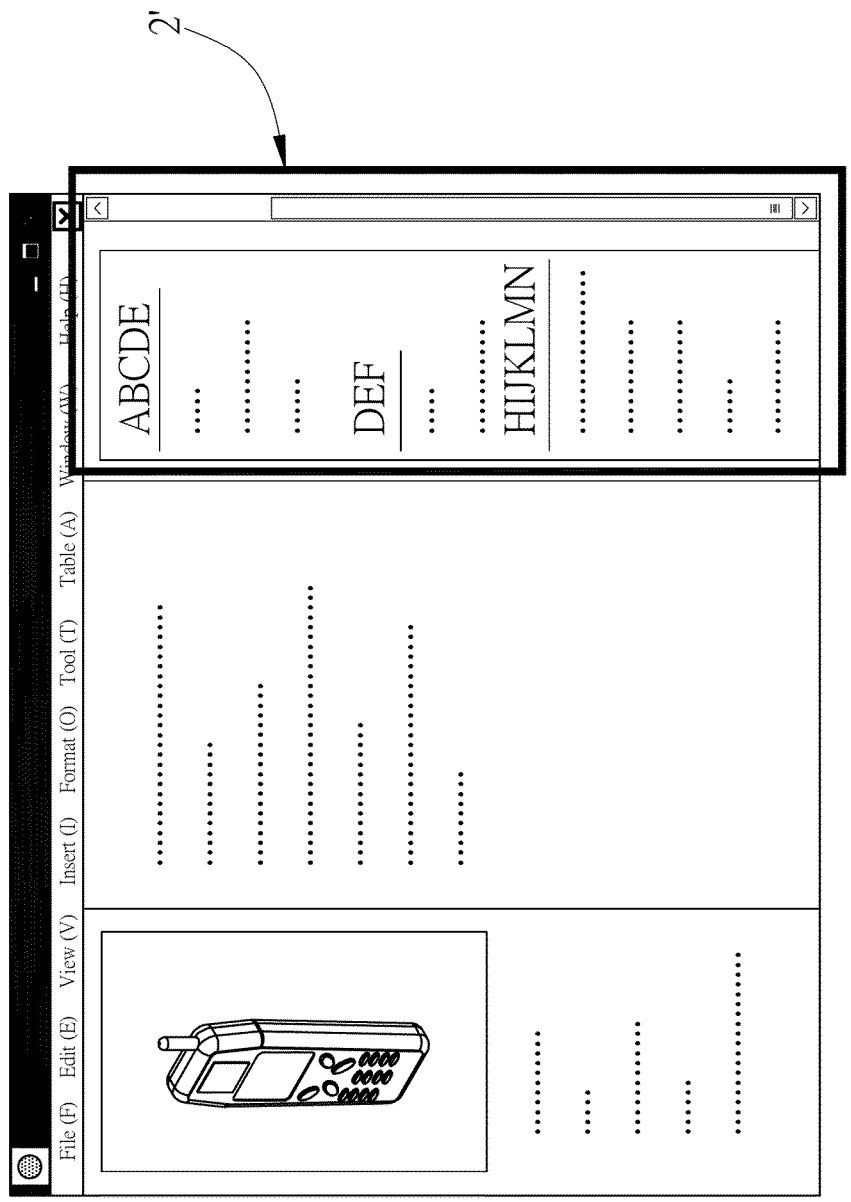
FIG. 2 is a diagram showing another conventional presentation style of an advertisement on a web page.
Figure 3:
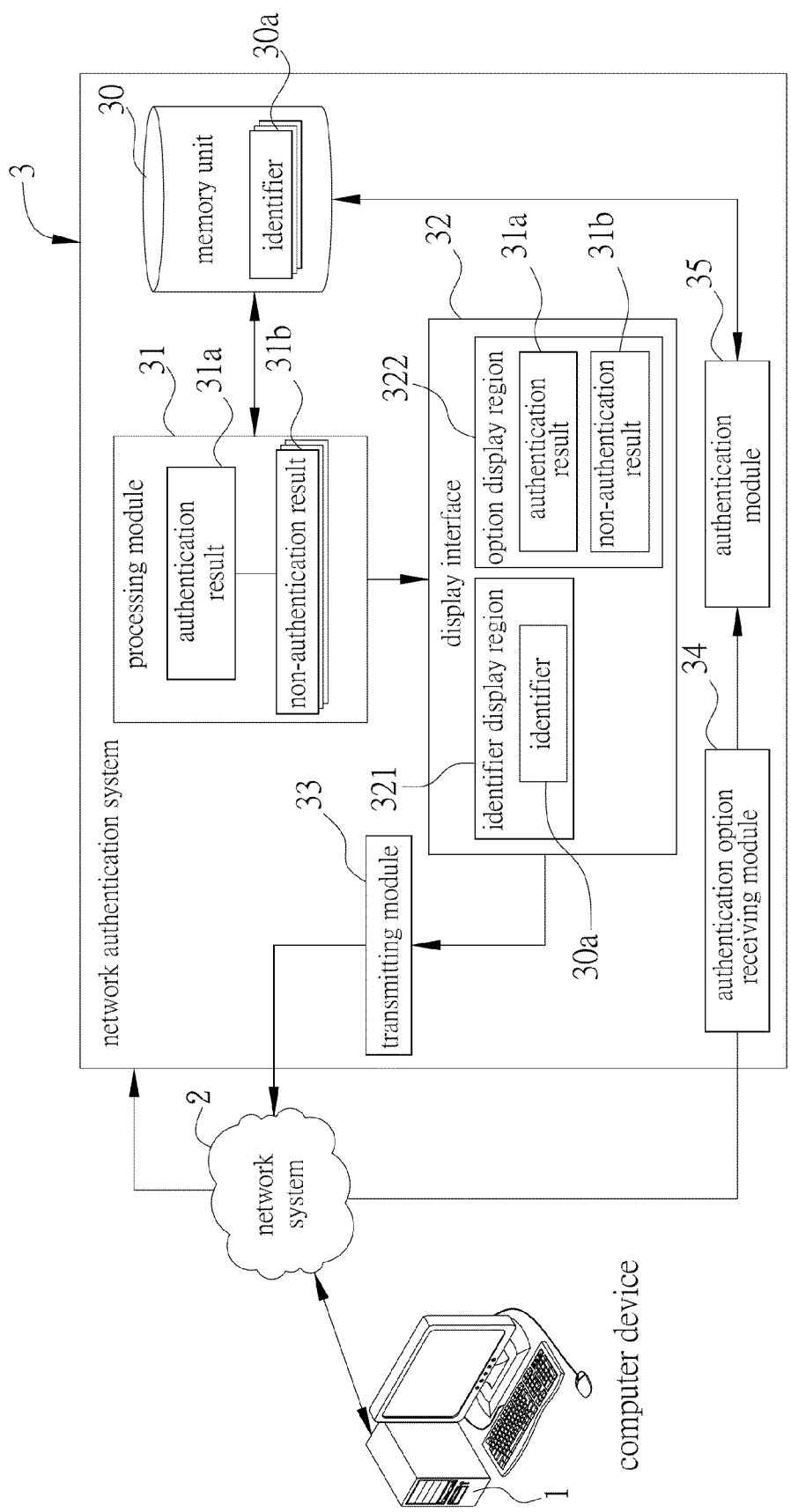
FIG. 3 is a block diagram showing the basic structure of a network authentication system according to the present invention.

FIG. 3 is a block diagram showing the basic structure of a network authentication system according to the present invention. As shown in the drawing, the network authentication system 3 is used for authenticating a user of a computer device 1 initiating an authentication request through a network 2 such as the Internet, thereby allowing the user to log onto a web page or other network equipment. Further, during the authentication process, an advertising effect in a network environment is achieved. The network authentication system 3 comprises a memory unit 30, a processing module 31, a transmitting module 33, an authentication option receiving module 34 and an authentication module 35.

The memory unit 30 stores a plurality of identifiers 30a. In the present embodiment, the identifiers 30a may be pictures, characters or strings, pictures with characters or strings, sounds, images, or images with sounds, wherein the pictures may be static pictures or dynamic pictures. After receiving an authentication request from a computer device 1, the processing module 31 retrieves at least one of the identifiers 30a from the memory unit 30 and processes the retrieved identifier 30a so as to form an authentication result 31a and a non-authentication result 31b distinct from the authentication result 31a. Further, the processing module 31 generates a display interface 32 according to the authentication result 31a and the non-authentication result 31b.

Figure 5:
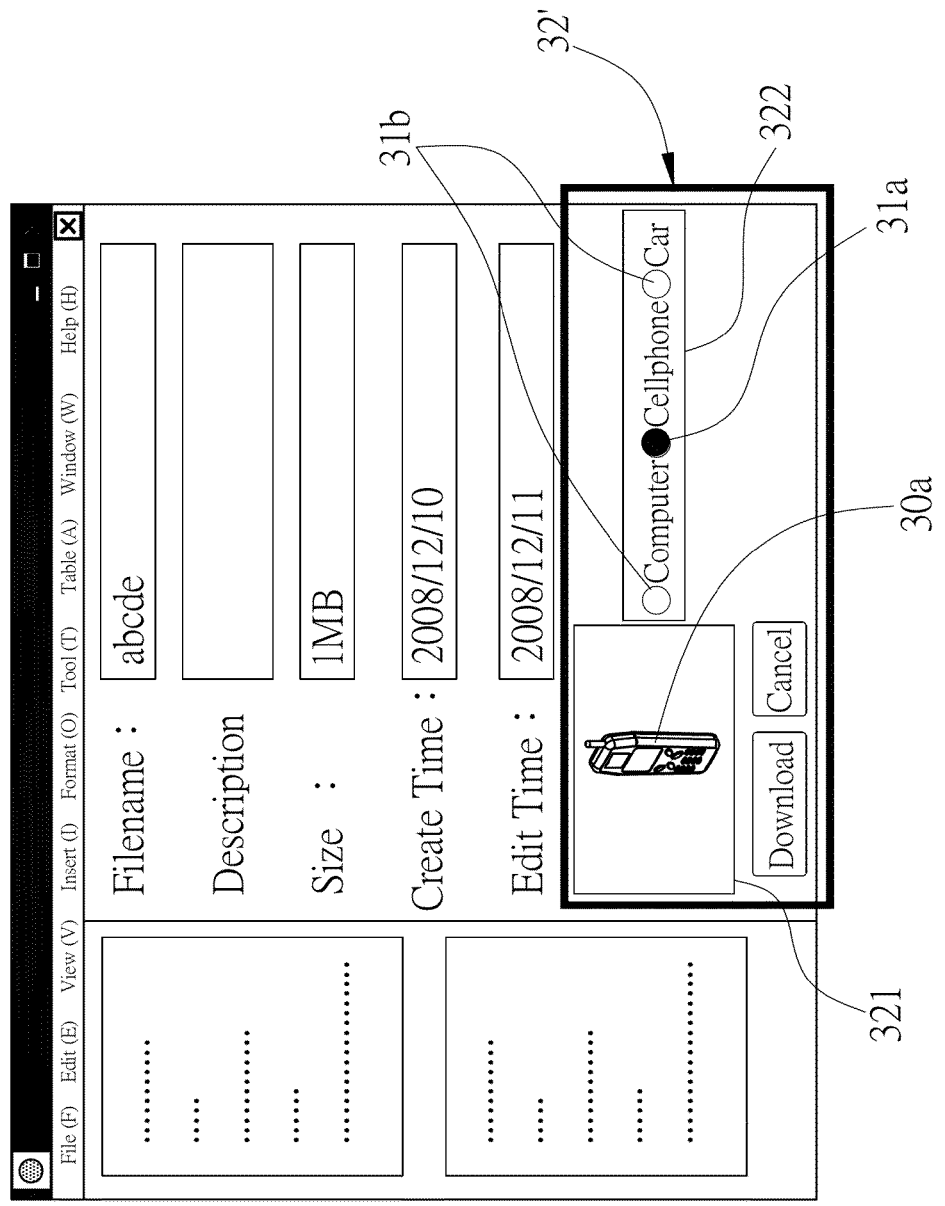
FIG. 5 is a diagram showing a display interface of the network authentication system and method according to a first embodiment of the present invention.
Figure 6:
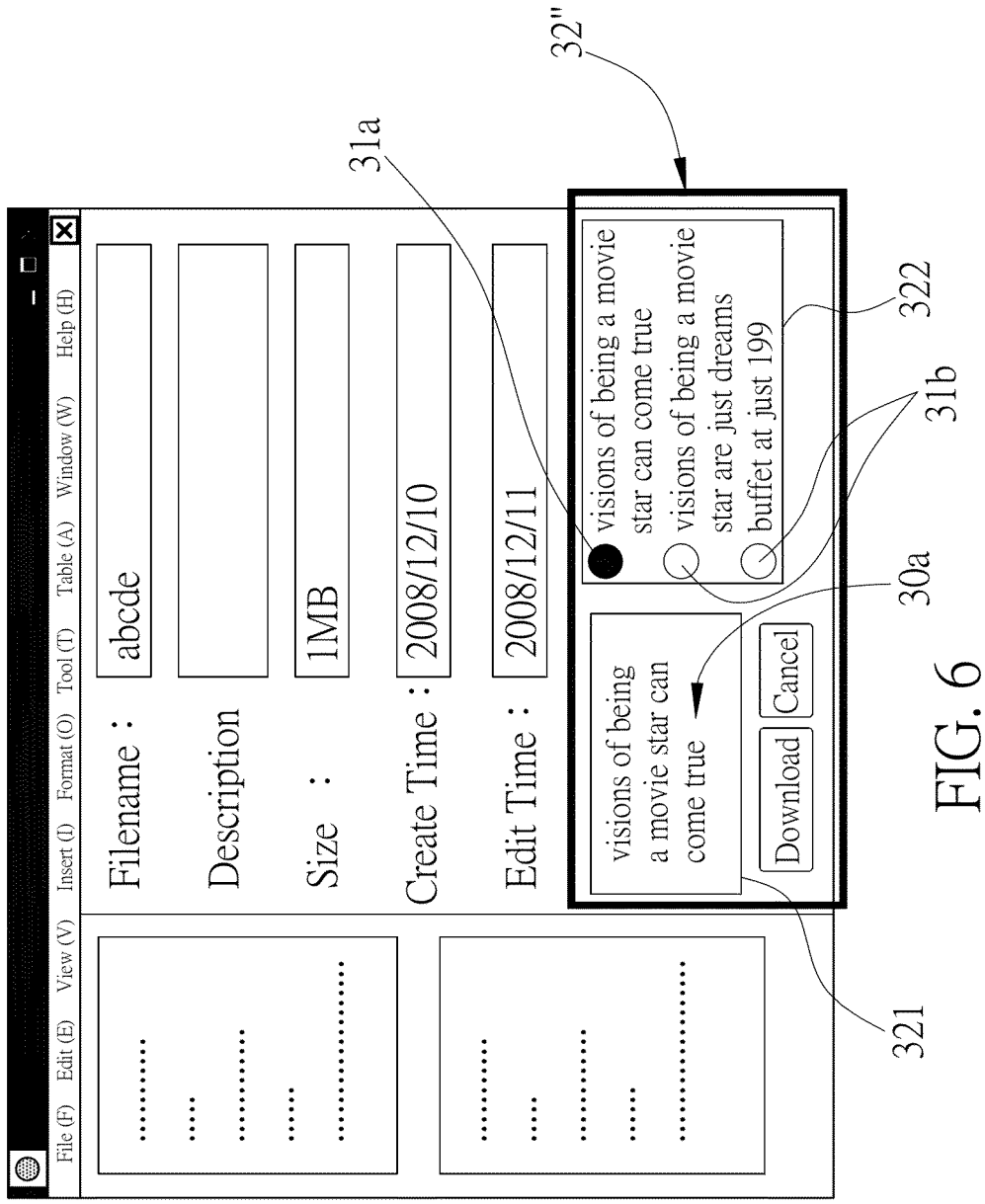
FIG. 6 is a diagram showing a display interface of the network authentication system and method according to a second embodiment of the present invention.

The display interface 32 comprises an identifier display region 321 and an option display region 322. The identifier display region 321 displays the retrieved identifier 30a, and the option display region 322 displays the authentication result 31a and one or more non-authentication results 31b distinct from the authentication result 31a. In order to achieve an advertising effect in the environment of the network 2, the identifier 30a may be a commodity entity, trademark graphic, advertising language or video file of a spokesperson. Correspondingly, the authentication result 31a is a message directly relevant to said commodity entity, trademark graphic, advertising language or video file of a spokesmen such that after the user of the computer device 1 browses the identifier 30a displayed on the display interface 32, the user can choose the authentication result 31a compatible with the identifier 30a. FIG. 5 and FIG. 6 show examples of two display interfaces 32' and 32". It should be noted that the number of non-authentication results 31b distinct from the authentication result 31a is not limited to two as shown in FIG. 5 or FIG. 6. Instead, the number of non-authentication results 31b can be one or more according to the practical need.

The display interface 32 is in the form of a web page or a dialog box.

The transmitting module 33 transmits the display interface 32 over a network 2 to the computer device 1 for display.

The authentication option receiving module 34 receives the response of the user with regard to the authentication result 31a or the non-authentication result 31b in the option display region 322 of the display interface 32 from the computer device 1. In the present embodiment, the authentication result 31a or non-authentication results 31b are presented as options in the option display region 322. As such, the response received by the authentication option receiving module 34 is either the authentication result 31a or a non-authentication result 31b.

The authentication module 35 determines whether the response from the computer device 1 is the authentication result 31a that was generated by the processing module 31 according to the identifiers 30a retrieved from the memory unit 30. If it is, authentication is successful, and the network authentication system 3 allows the user of the computer device 1 to perform subsequent processes such as logging onto a web page or downloading information. Otherwise, if the response is a non-authentication result, authentication fails and the user of the computer device 1 is given an opportunity to repeat authentication. Accordingly, the processing module 31 retrieves another identifier 30a from the memory unit 30 and generates another authentication result 31a according to the retrieved identifier 30a and one or more non-authentication results 31b distinct from the authentication result 31a, and further generates a display interface 32 comprising an identifier display region 321 and an option display region 322 and transmits the display interface 32 to the computer device 1 so as to allow the user to choose again from among the authentication result 31a and the one or more non-authentication results 31b displayed in the option display region 322.

In a preferred embodiment, the plurality of identifiers 30a stored in the memory unit 30 corresponds to first authentication codes (not shown), respectively. The authentication result 31a and non-authentication result 31b respectively correspond to different second authentication codes (not shown). Therefore, the authentication result 31a and non-authentication result 31b in the option display region 322 comprise the corresponding second authentication codes such that after the authentication result 31a or a non-authentication result 31b in the option display region 322 of the display interface 32 is chosen by the user of the computer device 1, the response received by the authentication option receiving module 34 is a second authentication code corresponding to the authentication result 31a or the non-authentication result 31b. Accordingly, the authentication module 35 compares the second authentication code with the first authentication code corresponding to the retrieved identifier 30a so as to determine whether the second authentication code is the same as the first authentication code, wherein, if it is, authentication is successful and the user is allowed to perform subsequent processes.

In the above-described embodiment, the first and second authentication codes can be randomly generated and further encrypted or coded, thereby preventing circumventing programs from identifying the identifiers 30a so as to prevent so-called cracking of the authentication process. In another embodiment, in order to prevent circumventing programs from easily cracking the authentication process, the processing module 31 changes the order of the authentication result 31a and the non-authentication result 31b in the option display region 322, and the processing module 31 generates a corresponding response result and inputs said response result into the authentication module 35 such that the authentication module 35 can determine whether the received response is the authentication result corresponding to the retrieved identifier 30a.

Figure 4:
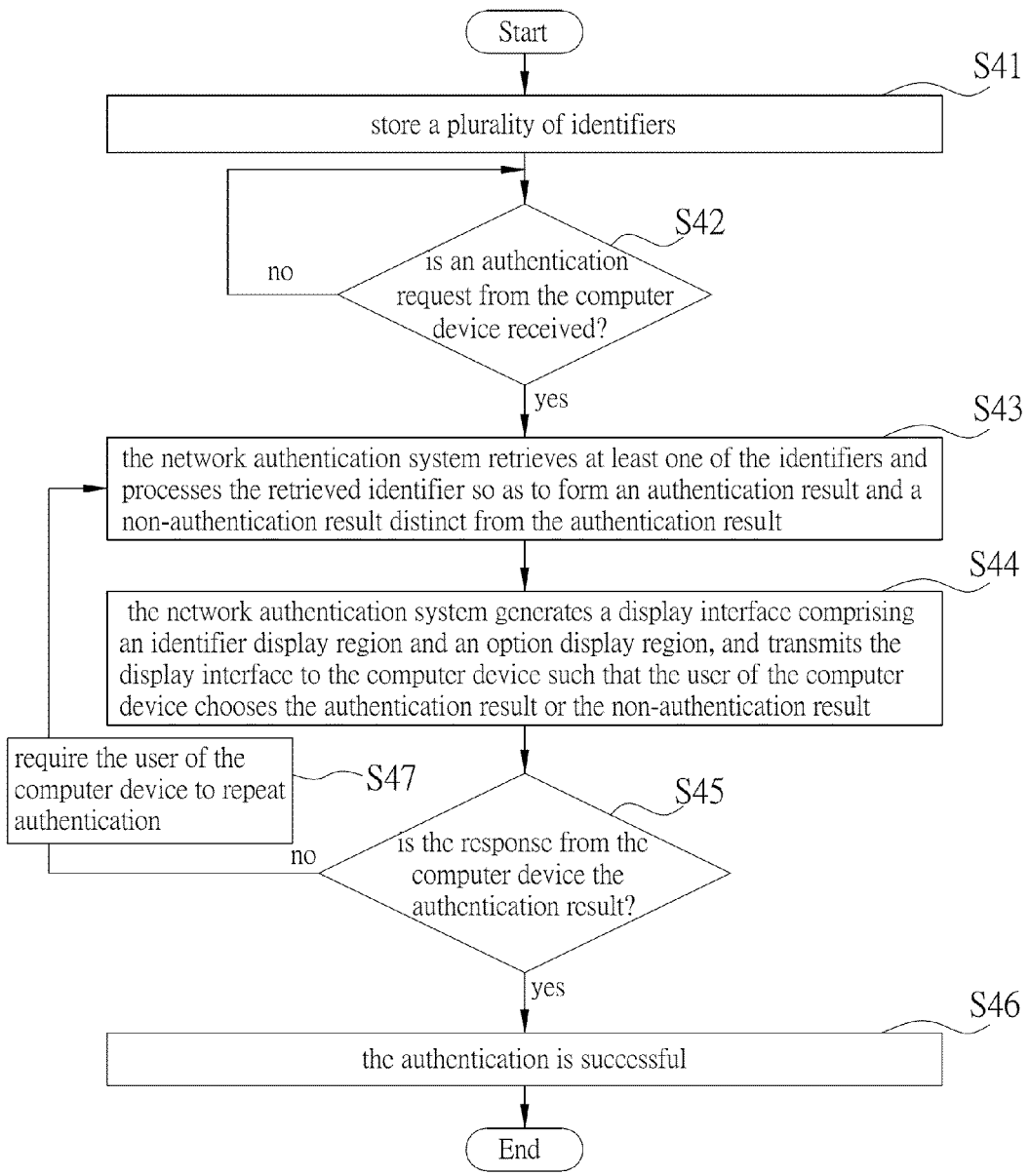
FIG. 4 is a flow diagram showing a network authentication method according to the present invention.

FIG. 4 is a flow diagram showing a network authentication method according to the present invention. The network authentication method is applied to a network authentication system for determining whether a user of a computer device is allowed to perform operations in a network environment. Meanwhile, during the authentication process, an advertising effect is achieved in the network environment. As shown in the drawing, first, in step S41, a plurality of identifiers is stored. Then, the process goes to step S42.

In step S42, the network authentication system determines whether an authentication request from the computer device through the network has been received, wherein, if one has, the process goes to step S43, otherwise, the process goes back to step S42.

In step S43, the network authentication system retrieves at least one of the identifiers and processes the retrieved identifier so as to form an authentication result and a non-authentication result distinct from the authentication result. Then, the process goes to step S44.

At step S44, the network authentication system generates a display interface comprising an identifier display region for displaying the retrieved identifier and an option display region for displaying the authentication result and the non-authentication result, and then the network authentication system transmits the display interface to the computer device such that the user of the computer device can choose the authentication result or the non-authentication result according to the displayed identifier. Then, the process goes to step S45.

In step S45, the network authentication system determines whether the response from the computer device is the authentication result, wherein, if it is, the process goes to step S46, or otherwise, the process goes to step S47.

In step S46, the authentication is processed as successful and the user of the computer device 1 is allowed to perform subsequent processes. Then, the authentication process is ended.

In step S47, the authentication fails, and the user of the computer device is directed to repeat authentication, and the process goes back to step S43.

FIG. 5 shows a display interface according to a first embodiment of the present invention. As shown in the drawing, the identifier display region 321 of the display interface 32' displays a commodity or an enterprise trademark. The option display region 322 displays an authentication result 31a associated with the commodity or enterprise trademark and one or more non-authentication results 31b unrelated with the commodity or enterprise trademark. After a user links to a specific web page equipped with ID authentication or identification, the display interface 32' is displayed for the user to choose the authentication result 31a or the non-authentication results 31b on the display interface 32'. Through this choosing and identification process, an advertising effect of the commodity or enterprise trademark is achieved.

FIG. 6 shows a display interface according to another embodiment of the present invention. As shown in the drawing, the identifier display region 321 of the display interface 32" displays an advertising slogan, and the option display region 322 randomly displays an authentication result 31a relevant to the advertisement slogan and one or more non-authentication results 31b unrelated to the advertising slogan. Similar to FIG. 5, after a user links to a specific web page with the display interface 32", the user needs to make a choice from among several options on the display interface 32". As a result, an advertising effect for the advertising slogan is achieved. In addition, the advertisement providers can gauge the effectiveness of the advertising slogan according to responses of users.

Figure 7:
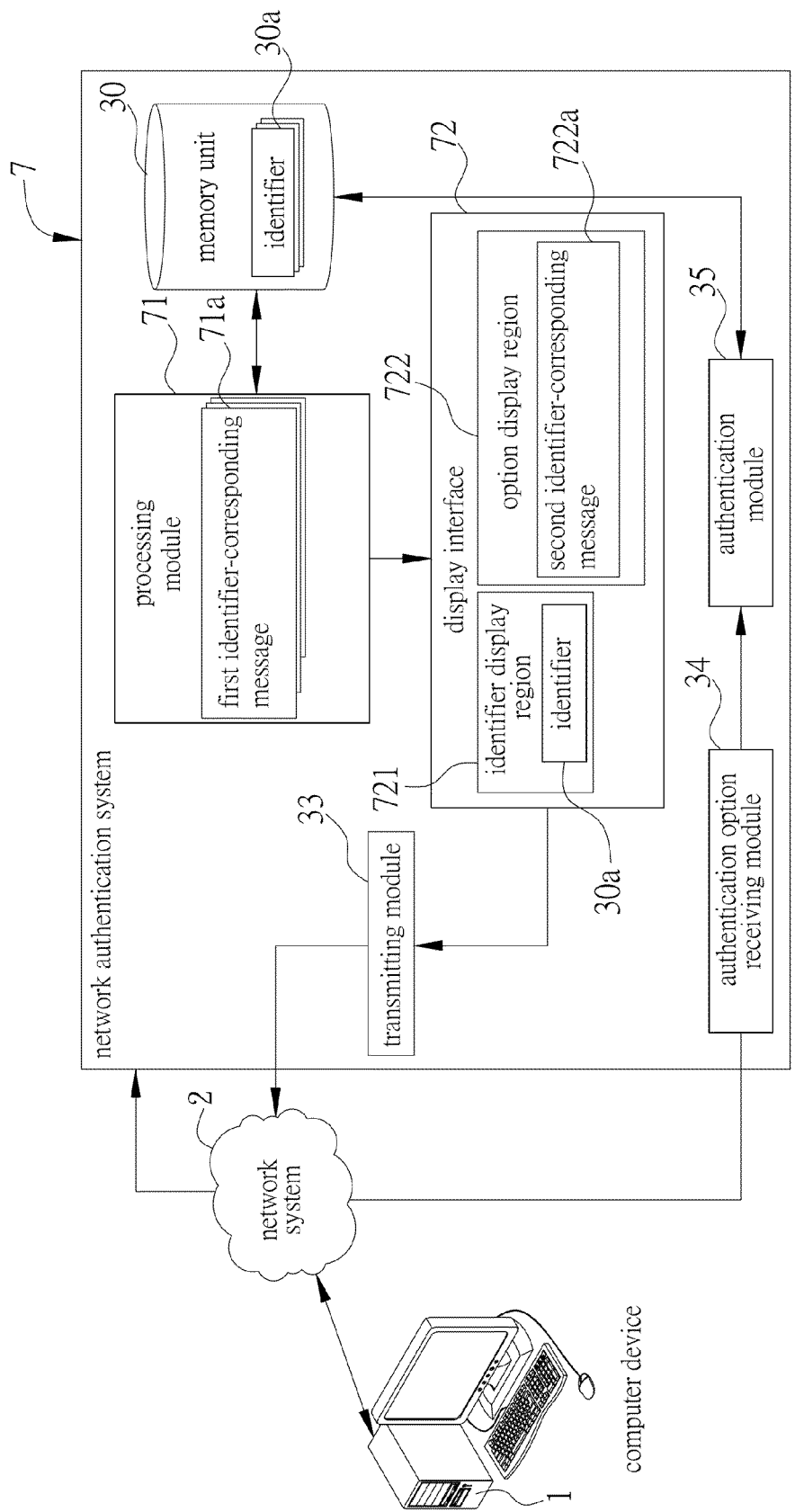
FIG. 7 is a block diagram showing the basic structure of a network authentication system according to another embodiment of the present invention.

FIG. 7 is a block diagram showing the basic structure of a network authentication system according to another embodiment of the present invention. As shown in the drawing, a network authentication system 7 is used for authenticating a user of a computer device 1 initiating an authentication request through a network 2, such as the Internet, thereby allowing the user to log onto a web page or network equipment. Further, during the authentication process, an advertising effect in a network environment is achieved. The network authentication system 7 comprises a memory unit 30, a processing module 71 (that generates a display interface), a transmitting module 33, an authentication option receiving module 34 and an authentication module 35.

The memory unit 30 stores a plurality of identifiers 30a. In the present embodiment, the identifiers 30a may be pictures, characters or strings, pictures with characters or strings, sounds, images, or images with sounds, wherein the pictures may be static pictures or dynamic pictures. After receiving an authentication request from the computer device 1, the processing module 31 retrieves at least one of the identifiers 30a from the memory unit 30 and processes the retrieved identifier 30a so as to form a first identifier-corresponding message 71a which is temporarily stored in the memory unit 30. Further, the processing module 71 generates a display interface 72, described next.

Figure 9:
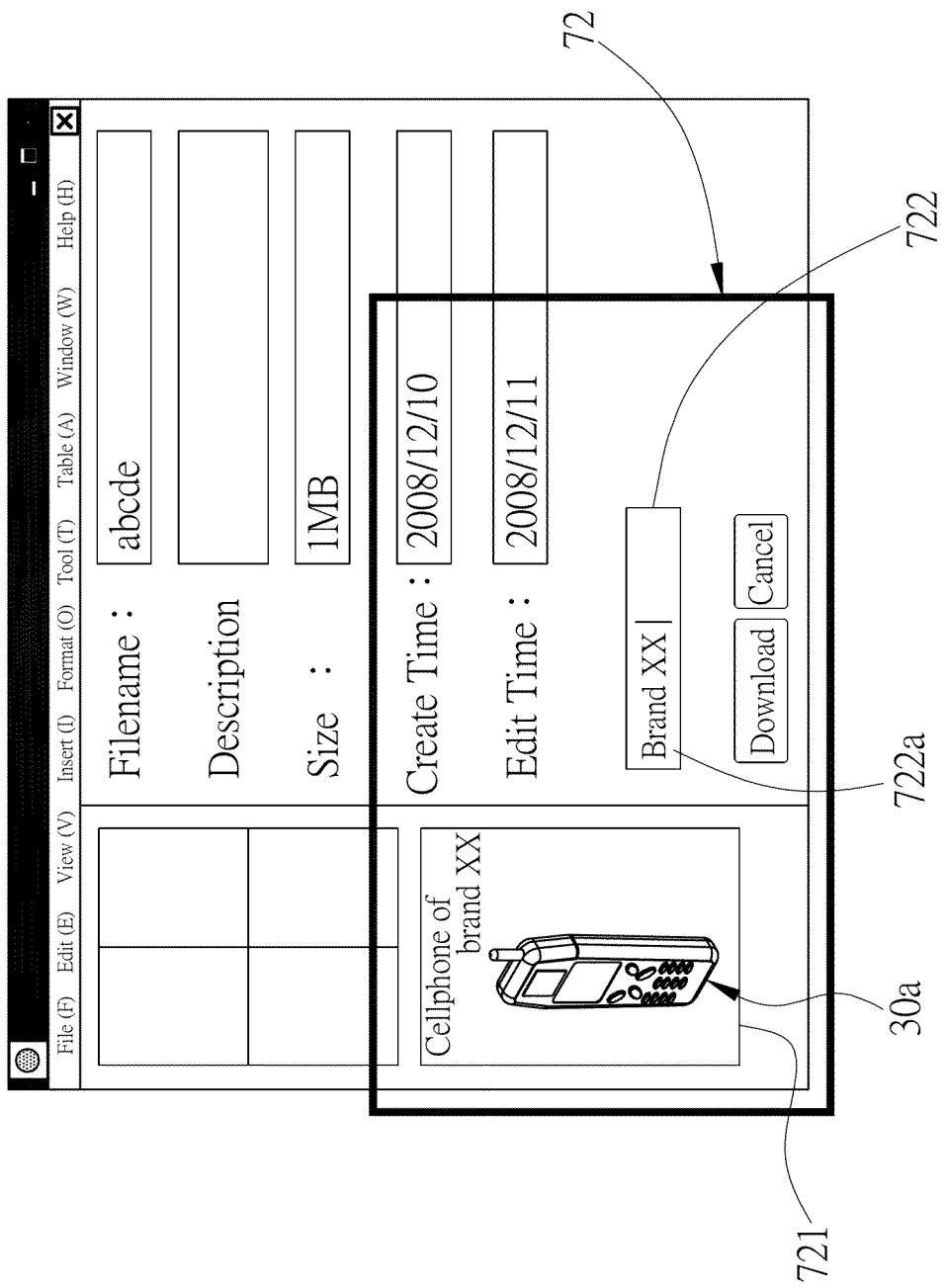
FIG. 9 is a diagram showing a display interface of the network authentication system and method according to a third embodiment of the present invention.

The display interface 72 comprises an identifier display region 721 and an option input region 722. The identifier display region 721 displays the retrieved identifier 30a. The option input region 722 displays an input region for the user of the computer device 1 to input a second identifier-corresponding message 722a according to the identifier 30a displayed in the identifier display region 721. In order to achieve an advertising effect in an environment of the network, the identifier 30a may be, for example, a commodity entity with an advertising slogan, a trademark graphic with and advertising slogan or video file of a spokesperson. After the user of the computer device 1 views the identifier 30a displayed on the display interface 72, the user inputs a second identifier-corresponding message 722a compatible with the identifier 30a. FIG. 9 shows the display interfaces 72, which can be in the form of a web page or a dialog box.

The transmitting module 33 transmits the display interface 72 to the computer device 1 for display.

The authentication option receiving module 34 receives the second identifier-corresponding message 722a in the option input region 722 of the display interface 72 entered by the user through the computer device 1 as a response of the user. In the present embodiment, the second identifier-corresponding message 722a may be composed of characters, numbers or symbols. The response received by the authentication option receiving module 34 is the second identifier-corresponding message 722a.

The authentication module 35 determines whether the response from the computer device 1 is the authentication result that was generated by the processing module 71 according to the identifiers 30a retrieved from the memory unit 30. If it is, the authentication is successful, and the network authentication system 7 allows the user of the computer device 1 to perform subsequent processes such as logging onto a web page or downloading information. Otherwise, if the response is not the authentication result, the authentication fails and the user of the computer device 1 is directed to repeat authentication, whereupon the processing module 71 retrieves another identifier 30a from the memory unit 30 and generates another identifier-corresponding message 71a according to the retrieved identifier 30a. It then further generates a display interface 72 comprising an identifier display region 721 and an option input region 722 and transmits the display interface 72 to the computer device 1 to allow the user to input authentication data again.

In a preferred embodiment, after the authentication option receiving module 34 receives the second identifier-corresponding message 722*a*, the authentication module 35 compares the second identifier-corresponding message 722*a* with the first identifier-corresponding message 71*a* to determine whether the second identifier-corresponding message 722*a* is the same as the first identifier-corresponding message 71*a*, wherein, if it is, the authentication is successful and the user is allowed to perform subsequent processes.

Figure 8:
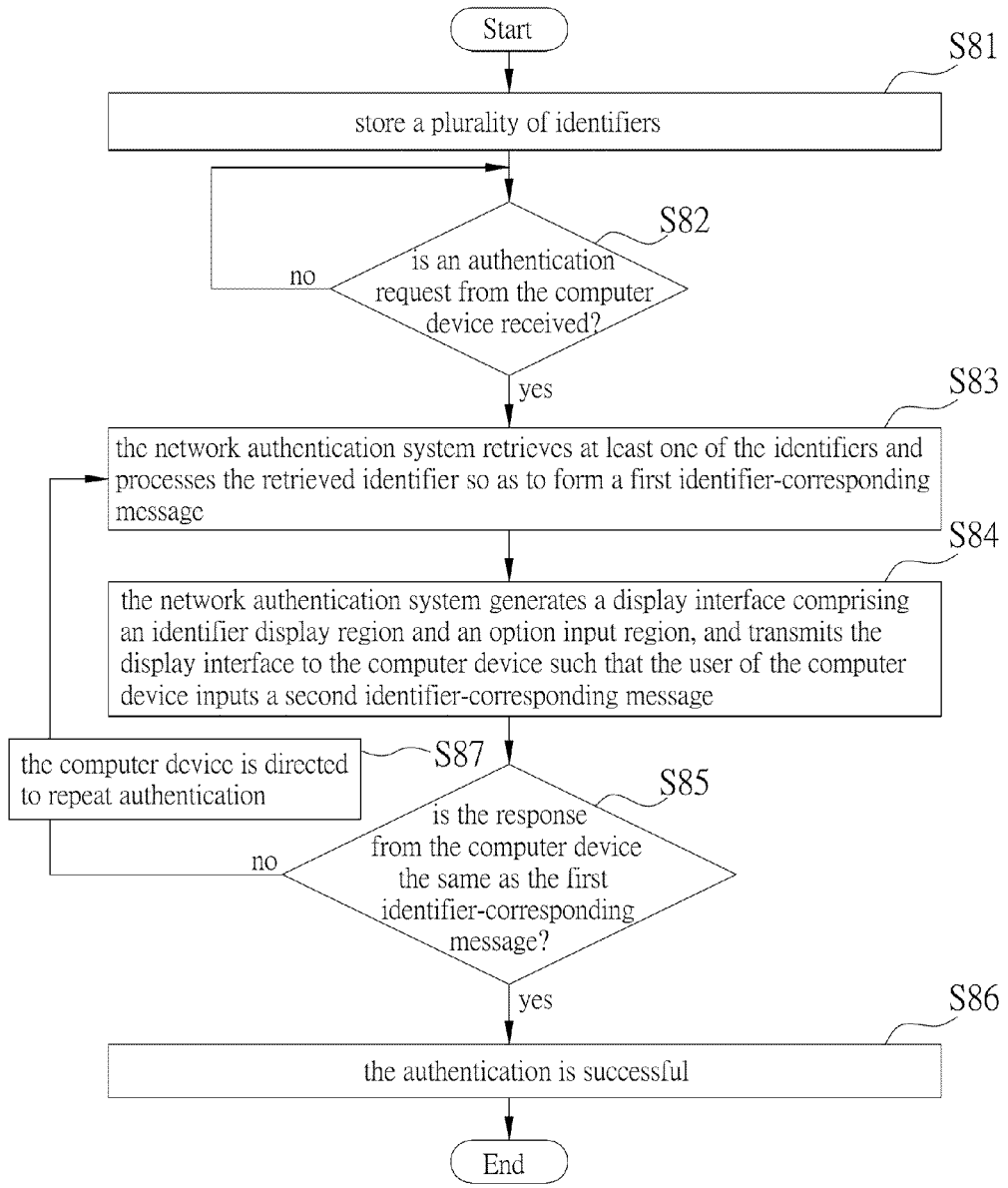
FIG. 8 is a flow diagram showing a network authentication method according to another embodiment of the present invention.

FIG. 8 is a flow diagram showing a network authentication method according to another embodiment of the present invention. The network authentication method is applied to a network authentication system for determining whether a user of a computer device is allowed to perform operations in a network environment. Meanwhile, during the authentication process, an advertising effect is achieved in the network environment. As shown in the drawing, first, in step S81, a plurality of identifiers is stored. Then, the process goes to step S82.

In step S82, the network authentication system determines whether an authentication request from the computer device through the network has been received, wherein, if it has, the process goes to step S83, or otherwise, the process goes back to step S82.

In step S83, the network authentication system retrieves at least one of the identifiers and processes the retrieved identifier so as to form a first identifier-corresponding message. Then, the process goes to step S84.

In step S84, the network authentication system generates a display interface comprising an identifier display region and an option input region and transmits the display interface to the computer device, wherein the identifier display region displays the retrieved identifier and the option input region displays an input region for the user of the computer device to input a second identifier-corresponding message according to the content displayed in the identifier display region. Then, the process goes to step S85.

In step S85, the network authentication system determines whether the response from the computer device is the same as the first identifier-corresponding message, wherein, if it is, the process goes to step S86, or otherwise, the process goes to step S87.

In step S86, the authentication is successful and the user of the computer device is allowed to perform subsequent processes. Then, the authentication process is ended.

In step S87, the authentication fails, and the user of the computer device is directed to repeat authentication, and then the process goes back to step S83.

FIG. 9 shows a display interface according to another embodiment of the present invention. As shown in the drawing, the identifier display region 721 of the display interface 72 displays, for example, a commodity or an enterprise trademark with an advertising slogan. After a user links to a specific web page for ID authentication or identification, the display interface 72 is displayed such that after the user views the commodity or an enterprise trademark with an advertising slogan displayed in the identifier display region 721, the user can input a second identifier-corresponding message 722*a* in the option input region 722. Through such a choosing and identification process, an advertising effect for the commodity or enterprise trademark is achieved.

In another embodiment, the display interface 72 further comprises a description display region for displaying a description or drawing so as to facilitate the user to understand how to input a corresponding message in the option input region 722.

In summary, the network authentication system and method of the present invention facilitates the identification of commodity advertisements or enterprise trademarks and achieves an advertising effect in a network environment during authentication of a user of a computer device. Additionally, the effectiveness of advertisements can be gauged through the present invention.

The above-described descriptions of the detailed embodiments are provided to illustrate the preferred implementation according to the present invention, and are not intended to limit the scope of the present invention. Accordingly, various modifications and variations completed by those with ordinary skill in the art will fall within the scope of present invention defined by the appended claims.

What is claimed is:

1. A network authentication method applied in a network authentication system, wherein the network authentication system is used to authenticate a user of a computer device initiating an authentication request through a network, the method comprising the steps of:

storing a plurality of identifiers in a memory unit;

receiving an authentication request from the computer device through the network, retrieving at least one of the identifiers from the memory unit, and processing the retrieved identifier so as to form an authentication result and a non-authentication (bogus) result distinct from the authentication result, allowing the network authentication system to thereby generate a display interface and transmit the display interface to the computer device, wherein the display interface comprises an identifier display region for displaying the retrieved identifier and an option display region for displaying the authentication result and the non-authentication result; and determining, after receiving a response of the user choosing among the authentication result and the non-authentication result in the option display region from the computer device, whether the response is the same as the authentication result, wherein, if it is, authentication is successful, and otherwise, the user of the computer device is directed to repeat authentication.

2. The method of claim 1, wherein the identifiers stored in the memory unit are selected from the group consisting of pictures, characters, strings, pictures with characters, pictures with strings, sounds, images, and images with sounds.

3. The method of claim 2, wherein the pictures are static pictures or dynamic pictures.

4. The method of claim 1, wherein the number of the non-authentication result distinct from the authentication result is one or more.

5. The method of claim 1, wherein each of the identifiers corresponds to a first authentication code, and the authentication result and non-authentication result respectively correspond to different second authentication codes, the response received by the network authentication system is a second authentication code corresponding to the authentication result or the non-authentication result, and the network authentication system compares the received second authentication code with the first authentication code corresponding to the retrieved identifier so as to determine whether the second authentication code is the same as the first authentication code, wherein, if it is, authentication is successful.

6. The method of claim 1, wherein the network authentication system changes the order of the authentication result and the non-authentication result in the option display region, and wherein the processing module generates a corresponding response result and inputs said response result into the authentication module such that the authentication module can determine whether the received response is the authentication result corresponding to the retrieved identifier.

7. A network authentication method applied in a network authentication system, wherein the network authentication system is used to authenticate a user of a computer device initiating an authentication request through a network, the method comprising the steps of:
   storing a plurality of identifiers in a memory unit;
   receiving an authentication request from the computer device through the network, retrieving at least one of the identifiers from the memory unit, and processing the retrieved identifier so as to form a first identifier-corresponding message, allowing the network authentication system to thereby generate a display interface and transmit the display interface to the computer device, wherein the display interface comprises an identifier display region for displaying the retrieved identifier and an option input region for displaying an input region for the user to input a second identifier-corresponding message according to the content displayed in the identifier display region as a response; and
   after receiving the response from the computer device, determining whether the response is the same as the first identifier-corresponding message, wherein, if it is, authentication is successful, and otherwise, the user of the computer device is directed to repeat authentication.

8. The method of claim 7, wherein the identifiers stored in the memory unit are selected from the group consisting of pictures, characters, strings, pictures with characters, pictures with strings, sounds, images, and images with sounds.

9. The method of claim 8, wherein the pictures are static pictures or dynamic pictures.

10. A network authentication system for authenticating a user of a computer device initiating an authentication request through a network, the system comprising:
    a memory unit for storing a plurality of identifiers;
    a processing module for receiving an authentication request from the computer device through the network, retrieving at least one of the identifiers from the memory unit, and processing the retrieved identifier so as to form an authentication result and a non-authentication (bogus) result distinct from the authentication result and thereby generate a display interface comprising an identifier display region for displaying the retrieved identifier and an option display region for displaying the authentication result and non-authentication result;
    a transmitting module for transmitting the display interface to the computer device;
    an authentication option receiving module for receiving a response of the user to the authentication result and the non-authentication result in the option display region from the computer device; and
    an authentication module for determining whether the response is the same as the authentication result, wherein, if it is, authentication is successful, and otherwise, the user of the computer device is directed to repeat authentication.

11. The system of claim 10, wherein the identifiers stored in the memory unit are selected from the group consisting of pictures, characters, strings, pictures with characters, pictures with strings, sounds, images, and images with sounds.

12. The system of claim 11, wherein the pictures are static pictures or dynamic pictures.

13. The system of claim 10, wherein the number of the non-authentication result distinct from the authentication result is one or more.

14. The system of claim 10, wherein each of the identifiers corresponds to a first authentication code, and the authentication result and non-authentication result respectively correspond to different second authentication codes, the response received by the authentication option receiving module is a second authentication code corresponding to the authentication result or the non-authentication result, and the authentication module compares the received second authentication code with the first authentication code corresponding to the retrieved identifier so as to determine whether the second authentication code is the same as the first authentication code, wherein, if it is, authentication is successful.

15. The system of claim 10, wherein the processing module changes the order of the authentication result and the non-authentication result in the option display region, and wherein the processing module generates a corresponding response result and inputs said response result into the authentication module such that the authentication module can determine whether the received response is the authentication result corresponding to the retrieved identifier.

* * * * *